Sept. 10, 1935.  W. E. CURRY  2,013,711
ADJUSTABLE SPOKE FOR THE DRIVE WHEEL OF AUTOMOBILES
Filed June 21, 1935
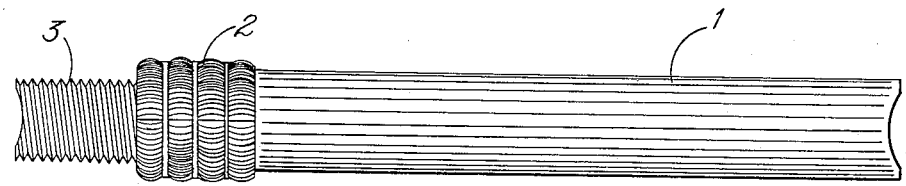
FIG. I
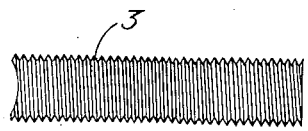 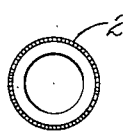 
FIG. II   FIG. III   FIG. IV
 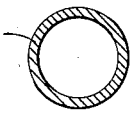
FIG. VI   FIG. V
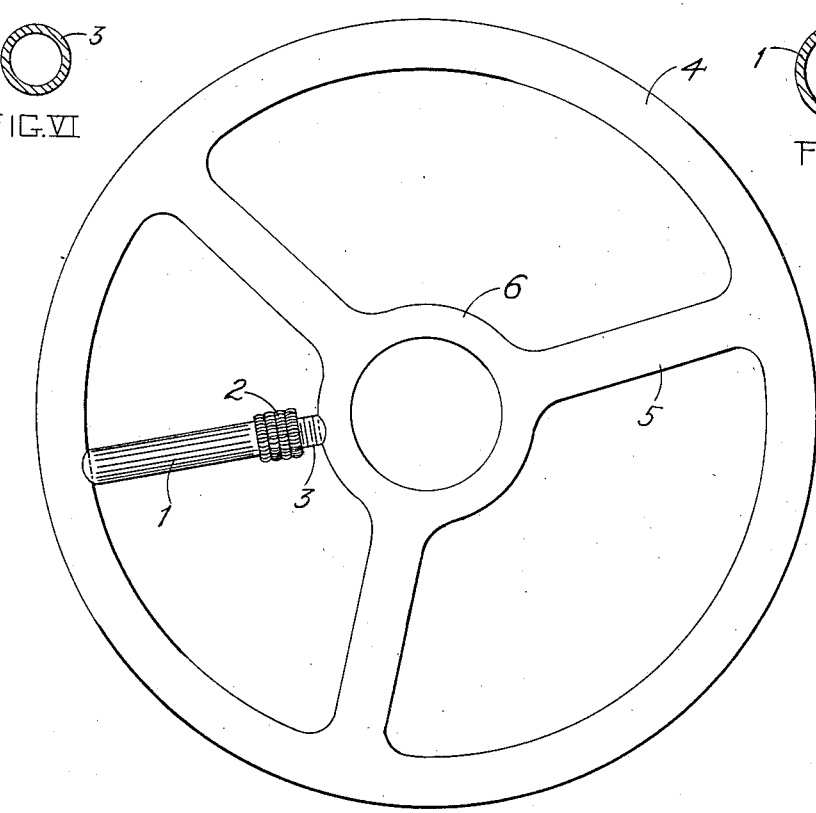
FIG. VII
INVENTOR.
William E. Curry Patented Sept. 10, 1935

2,013,711

UNITED STATES PATENT OFFICE 2,013,711

ADJUSTABLE SPOKE FOR THE DRIVE-WHEEL OF AUTOMOBILES

William E. Curry, Louisville, Ky.

Application June 21, 1935, Serial No. 27,633

3 Claims. (Cl. 74—557)

My invention relates generally to adjustable appliances adapted to be temporarily affixed to the steering wheels of automobiles for the purpose of safety and convenience in driving. And the principal object of my invention is to design and develop a serviceable hand-rest adapted to be removably attached, in a predetermined position, to the driving-wheel of an automobile to aid the driver to operate the wheel in running the machine with a greater degree of convenience and safety. And another object of my invention is to devise an auxiliary spoke for the driving wheel of an automobile, that will be strong and simple in construction and economical in fabrication and readily attached to, or removed from, any one of the various sizes of the steering wheels of automobiles.

With the above and other objects in view which will appear in the progress of the description, it will be clearly understood that my invention, the new and useful, adjustable spoke for the drive-wheel of automobiles, is a practical device embodying said novel means and other new and useful details of construction, arrangement and combination of parts, all of which together with their functions will be described at length with reference to the drawing and will be definitely pointed out in the claims that follow the description, so that any person skilled in the art may understand how to construct and use this device.

The drawing accompanying and forming a part of this specification illustrate one of the practical, commercial embodiments of my invention; but it should be understood that the specific detail of parts of the invention which I have herein illustrated and described, are not to be construed as limitations of my practical device; and that while keeping within the scope of the invention and claims, any desirable modification of these details may be made to facilitate production or economize in the fabrication of the parts, provided the modification be kept within the scope and spirit of the invention.

In said drawing, Figure I is a side view, in elevation, of my new adjustable spoke for the drive-wheel of automobiles, the parts being assembled ready to set into the drive-wheel.

Fig. II is a side view, in elevation, of the threaded inner tube of my device. Fig. III is an end view, in elevation, of the knurled nipple which in its service position is threaded on the inner tube, as shown in Figs. I and VII.

Fig. IV is a side view, in elevation, of the hollow, cylindrical, handle-portion of my adjustable steering-wheel spoke.

Fig. V is a cross-section of the hollow, cylindrical, handle-portion of said spoke.

Fig. VI is a cross-section of said threaded inner tube of said spoke; and Fig. VII is a plan view of the steering-wheel of an automobile having one of my adjustable spokes set in its normal service position between the felly and the hub of the wheel.

This invention has been worked out and developed experimentally with special consideration of its parts and functions as a decided improvement over prior art in economy of production and convenience of installation and removal. And this invention is intended as an improvement on a previous invention of mine for a similar purpose, on which I filed an application for United States Letters Patent, Feb. 14, 1935, Serial No. 6445. And the purpose of the present invention is especially directed toward simplicity of structure and convenience in general use.

These adjustable auxiliary spokes, adapted for use in the driving-wheels of automobiles, enables the driver of the machine to have a strong and positive hold on his driving-wheel in times of emergency, without being obliged to keep a continuous, firm and wearisome grip on the smooth rim of the driving-wheel. For this adjustable spoke may be set into the drive-wheel in any predetermined position which is comfortable for the driver. And with these purposes and the special objects aforesaid in view, I will now describe my invention at length, pointing out specifically the new and useful features and explaining the purpose and the operations of the individual parts and the combinations thereof, as illustrated in the drawing hereinabove described in which similar letters and characters refer to similar parts throughout the several views.

In the design and construction of my new adjustable spoke for the drive-wheel of automobiles, I have provided a plain, round tube 1 of a desirable size for the handle-part of the device, and in length, less than the distance from the hub 6 to the felly 4 of the steering-wheel of an automobile. This tube 1 is smooth inside and square-cut across the inner end, but at the outer end, it is finished in a curved depression adapted to fit the convex surface of the inner curve of the felly 6 of a driving-wheel of an automobile. Now, as an auxiliary extension to this handle-part 1, I have devised a much shorter tube 3, having threads on its outer surface over its entire length and in size adapted to slip-fit into the square-cut end of the hollow handle-part 1. The inner end of the threaded tube 3, which in assembling is pushed into the square-cut end of the hollow tube 1, is square-cut; and the outer end is finished in a curved depression adapted to fit the convex surface of the rim of the hub 6 of the driving-wheel, as shown in Figs. II and VII.

Now, to operate in combination with this handle-part 1, and the shorter, threaded tube 3, I have provided a long, knurled adjusting nut 2, having internal threads adapted to fit the external threads on the shorter tube 3. The adjusting nut 2 is made long and knurled so that it can be turned readily with a hand-grip.

A brief study of the foregoing in connection with the accompanying drawing will disclose to anyone skilled in the art, the simplicity, the economy and the efficiency of my new adjustable driving-wheel spoke for automobiles. And the convenience in assembling the coacting parts of the driving-spoke and of installing it in the steering-wheel of an automobile, is plainly self-evident; as we merely push the square-cut end of the threaded tube 3 into the square-cut end of the plain tube 1 until the knurled nut 2 rests against the square-cut end of the handle-part 1; and we continue to hold these parts in this position, assembled. We then fit the curved end of tube 1 over the inner edge of the felly 4 in the steering-wheel, as shown in Fig. VII. And, while keeping the adjusting nut 2 pressed lightly against the square-end of the tube 1, we turn the nut 2 to a place on the threaded extension tube 3 that will enable us to adjust radially the depressed end of tube 3 on over the edge of the convex surface of the hub 6, so that the extension tube 3 cannot turn while we rotate the adjusting nut 2 in such a way as to force outward the extension tube 3 while the depressed end of tube 1 is still adjusted to the inner convex surface of the felly 4. Now, a slight rotation of the knurled adjusting nut 2 in the same positive direction for forcing outward the extension tube 3 will serve to clamp the auxiliary spoke between the hub 6 and the felly 4, as shown in Fig. VII, so forcibly as to hold it rigidly and securely fixed in its place and safe for all practical purposes of controlling the steering-wheel. And to change the radial position of the driving-spoke, or to remove it completely from the drive-wheel, we merely rotate the adjusting nut 2 in the opposite direction far enough to relieve the pressure of the extended spoke against the parts of the driving-wheel and the spoke can be readily adjusted to another place in the wheel or completely removed therefrom.

By observing these foregoing suggestions and directions herein set out at length, a driver should be able to install one of these adjustable, auxiliary driving-spokes in his steering-wheel easily and quickly in whatever radial position he may find comfortable and convenient for him in driving.

And, now, having thus described the various features of my invention, the detail construction, arrangement and combination of its parts as well as its purposes and methods of application and use; those features and combinations of my invention that I consider new and useful, economical and efficient for safety in driving automobiles, and on which I desire Letters Patent granted to me, I have hereinbelow set forth specifically in the following claims:—

I claim:—

1. For an automobile driving-wheel, an adjustable, auxiliary driving-spoke composed of three parts,—a piece of tube for a handle-part, smooth inside and out and having a square-cut at one end and a depression at the other end; a shorter extension tube provided with exterior threads over its entire length and adapted to slip-fit into said handle-part; and a knurled adjusting nut provided with internal threads adapted to mesh with the external threads on the extension tube and designed to be screwed back and forth on said extension tube, while being pressed against the square-cut end of the handle-part, to increase or decrease the over-all length of the said adjustable driving-spoke.

2. An adjustable spoke adapted to be installed radially between the hub and the felly of the drive-wheel of an automobile, comprising the combination with a tubular handle-piece, square-cut at one end and concave-cut at the other end to fit the curved inside surface of the rim of said wheel; of a threaded extension tube adapted to telescope into said handle-piece but shorter than the handle-piece and provided with a curved depression at its outer end and having an adjusting nut threaded thereon and adapted to be rotated against the square-cut end of said handle-piece to increase or decrease the over-all length of said adjustable spoke, when all its parts are assembled.

3. In an adjustable, auxiliary spoke adapted to be installed radially between the hub and felly of the steering-wheel of an automobile: a tubular-part of predetermined size and length, square-cut at its inner end and having in its outer end a depression, of curved outline, adapted to fit the convex surface of the inner arc of said steering-wheel; an extension tube shorter than said tubular-part, and having a curved-line depression cut in one end, adapted to fit the convex surface of the outer edge of said hub to hold it from slipping or turning when pressed against said outer edge, said extension tube being threaded externally along its entire length and adapted to slip-fit into said tubular part; and a knurled adjusting nut having internal threads adapted to fit the external threads on said extension tube, said adjusting nut being designed, to abut against the square-cut end of said tubular-part and to be rotated by the hand of the driver to increase or decrease the over-all length of said adjustable spoke, when all its parts are assembled.

WILLIAM E. CURRY.